J. T. SMITH.
BALING PRESS.
APPLICATION FILED NOV. 30, 1917.
1,302,723.
Patented May 6, 1919.
2 SHEETS—SHEET 1.
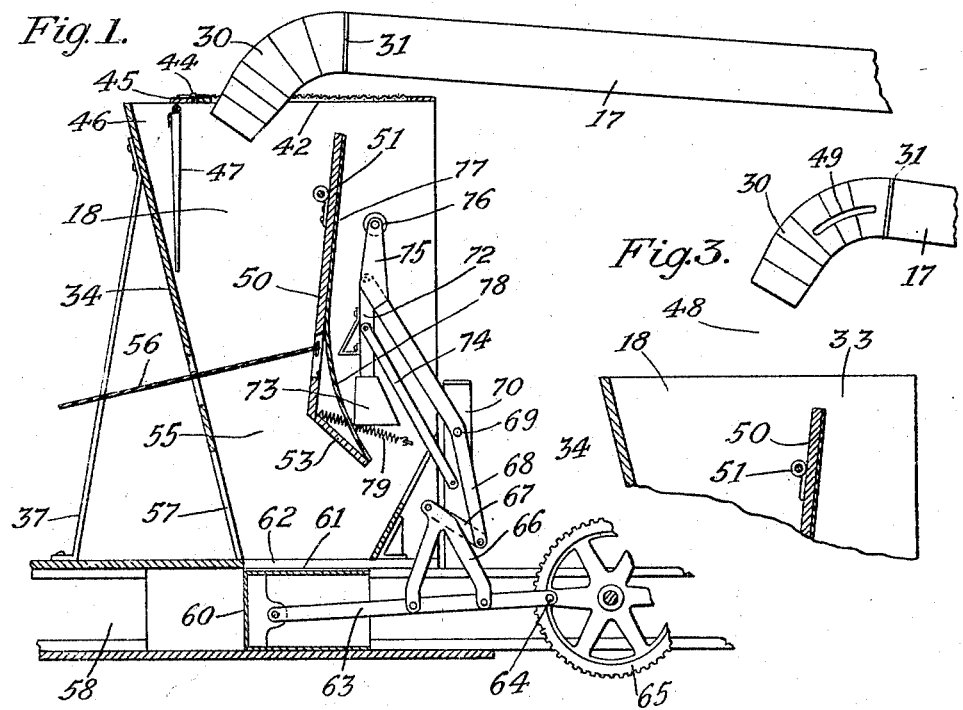
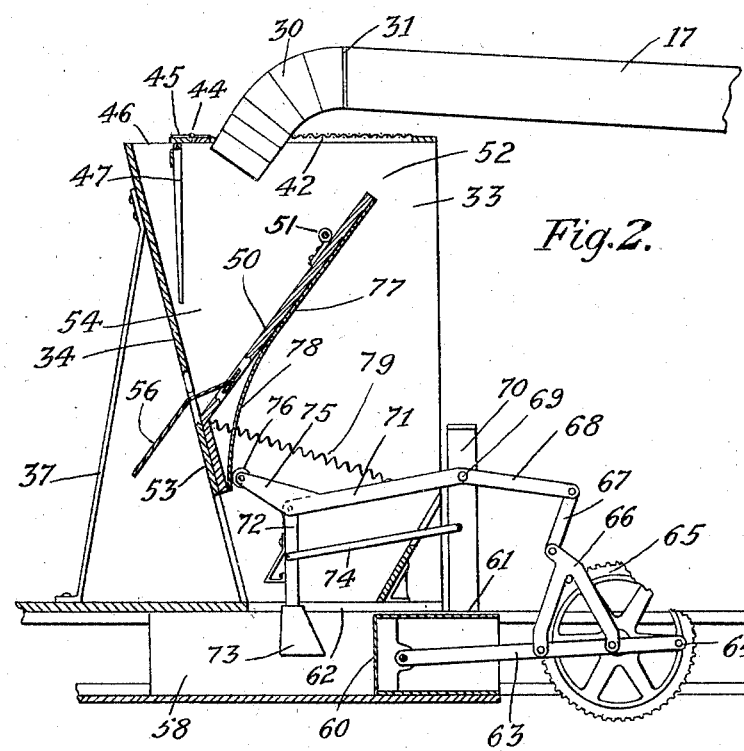
INVENTOR:
John T. Smith.
BY
ATTORNEY J. T. SMITH.
BALING PRESS.
APPLICATION FILED NOV. 30, 1917.
1,302,723.
Patented May 6, 1919.
2 SHEETS—SHEET 2.
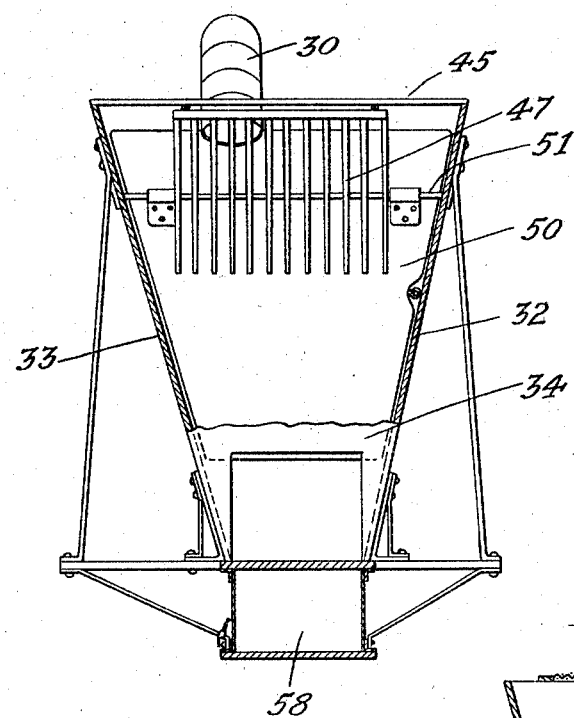
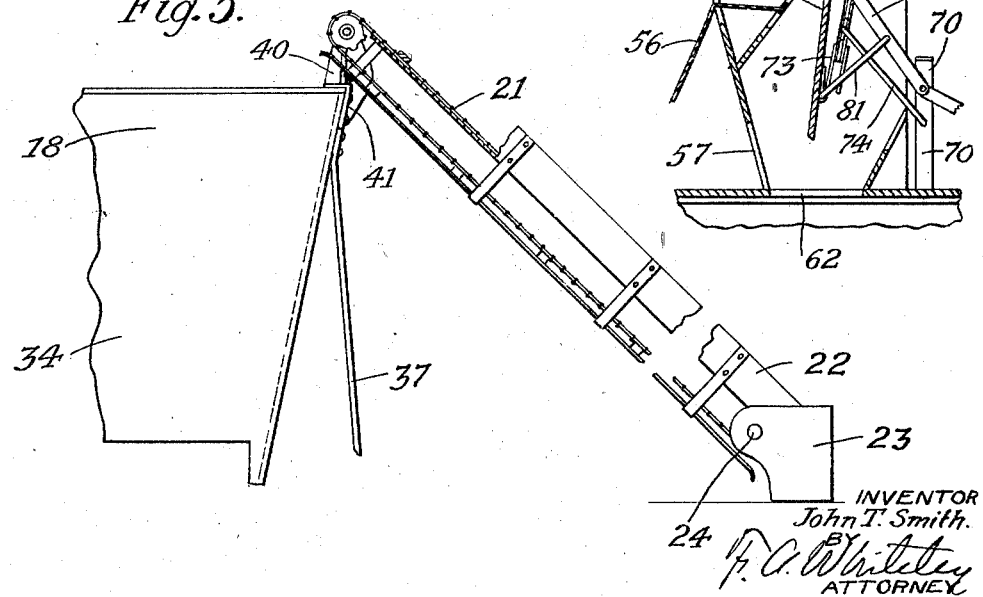
INVENTOR
John T. Smith.
BY
ATTORNEY

UNITED STATES PATENT OFFICE.

JOHN T. SMITH, OF HOPKINS, MINNESOTA.

BALING-PRESS.

1,302,723. Specification of Letters Patent. Patented May 6, 1919.

Application filed November 30, 1917. Serial No. 204,730.

*To all whom it may concern:*

Be it known that I, JOHN T. SMITH, a citizen of the United States, residing at Hopkins, in the county of Hennepin and State of Minnesota, have invented certain new and useful Improvements in Baling-Presses, of which the following is a specification.

My invention relates to baling presses and has for its object to provide a baling press having mechanism for receiving the straw from the discharging means of the separator whether it be a carrier or a blower, and for pressing and baling said straw so that the same may be used in commerce. It is a further object of my invention to provide an improved process of preserving the straw as the same comes from a separator or threshing machine. It is a further object of my invention to provide in combination with means for receiving and baling straw as the same is discharged from a separator or threshing machine means for separating the straw from the chaff and fine material so that the portion baled shall be clean, bright straw.

The full objects and advantages of my invention will appear in connection with the detailed description thereof and are particularly pointed out in the claims.

Figures 1 and 2 are side sectional elevations through the baling press showing the parts in two different positions. Fig. 3 is a detail view showing the manner of feeding material from a blower into an unscreened top of the baler. Fig. 4 is a sectional rear elevation of the baling press and hopper. Fig. 5 is a side elevation view of a form of attachment of a carrier to the hopper of the baling press. Fig. 6 is a side sectional elevation of the modified form of receiving hopper and baling apparatus.

As illustrated in Figs. 1 to 4, wind stacker pipes 17 may be carried directly to a baler hopper 18 mounted upon a suitable frame or, as shown in Fig. 5, a carrier 21 on a carrier frame 22 may deliver to the hopper. In this figure the frame is pivoted at 24 to a stand 23 and the upper end of the carrier is supported upon a stand 40 connected to the side of the hopper as indicated at 41.

As shown in Figs. 1–4 the wind stacker 17 has a portion 30 which is swiveled at 31 to the main pipe thus permitting it to be turned to direct the stream of straw toward the hopper and also to permit the end of the wind stacker to enter the proper opening in hopper 18.

This hopper consists of diverging side walls 32 and 33 and a correspondingly diverging front wall 34, the back of the hopper being entirely open as clearly shown in the drawings. Walls 32 and 34 are supported at their bottoms upon the press frame 36 and are supported adjacent their tops by braces 37. The discharge-nozzle 30 of the wind stacker where used may pass through a screen 42. This screen is hingedly connected at 44 with a cross bar 45 supported upon the top of the hopper and spaced from the front wall 34 a certain distance, as indicated at 46. From the cross bar 45 is suspended a grid 47 which catches the straw and prevents it following part of the air from the wind stacker through the opening 46. The rest of this air can pass out through the screen 42 and the open back of the hopper. In practice, however, I have found the arrangement illustrated in Fig. 3 to be very satisfactory, wherein no screen 42 or grid 47 is employed, but the end 30 of the wind stacker is spaced a sufficient distance, as indicated at 48, from the open top of the hopper 18. In this case the material from the stacker is blown into the hopper and the air can escape over the top of the hopper by the space 48. To further facilitate rapid escape of air, apertures, such as indicated at 49, may be formed in the nozzle 30.

Referring particularly to Figs. 1 and 2, a division board 50 is shown pivotally hung upon a rod 51 supported upon the side walls 32 and 33 of the hopper. This division board is spaced from the screen 42 or the top of the hopper at its upper end, as indicated at 52, and is formed with a lip 53 at its lower end spaced somewhat from the bottom of the hopper and arranged so that when the division board is put into the position shown in Fig. 2 the lip will engage the front wall 34 and there will be formed by the division board and such front wall in conjunction with the side walls 32 and 33 a pocket or compartment 54 for receiving and retaining the straw from the blower nozzle 30 or the carrier 21. The division board 50 will under influence of gravity normally take the spaced vertical position shown in Fig. 1 wherein a throat of extended opening 55 is provided for discharging into the lower part of the hopper. A cord 56 is attached to the division board 50 and extends through an opening in the front wall 34 where it can be engaged by the operator to hold the division board closed while a parting strip or follower is inserted through opening 57 in wall 34 at the end of a completed bale, thus forming a separating partition between such completed bale and the next one, these bales being formed in press chamber 58 in a well known way. At all other times the division board 50 is caused to oscillate by a mechanism which will now be described: The press plunger 60 has a top wall 61 of sufficient size to cover the opening 62 in the bottom of the hopper 18 when the plunger is in its most advanced position and when the plunger is in retracted position the opening will be entirely unobstructed, as indicated in Fig. 2. The plunger is operated by a pitman 63 having a crank connection 64 with a driven wheel 65. A stand 66 is connected with the pitman 63 and a link 67 is pivotally connected at one end to the stand 66 and at the other end to a lever arm 68 pivoted at 69 to a stand 70 having a forwardly extended lever arm 71 to which is pivoted an arm 72 carrying a pusher head 73, said arm 72 and pusher head 73 being constrained to move in a fixed downward path by a link 74 pivotally connected to the arm 72 and to the stand 70. A projection 75 on the arm 71 carries a roller 76 which engages a cam surface 77 on division board 50 which is curved as indicated at 78. From this organization of elements and having reference to Figs. 1 and 2 it will be seen that as the plunger head 61 is retracted from its forward position in Fig. 1 when the division board is in its normal position leaving opening 55 so as to permit material to fall to the bottom of the hopper 18, the roller 76 is brought into engagement with the cam surface 77 and moving along the same forward the division board to the position indicated in Fig. 2 thus closing half the compartment 54 at the same time that the pusher head 73 goes down into the press chamber 58. The division board 50 will operate with reasonable precision under the influence of gravity, but a spring 79 may be employed to aid in the return of the division board. It will thus be apparent that by a movement synchronized with that of the press plunger 60 the division board 50 is moved to close off chamber 54 and the plunger 73 is caused to engage material which is dropped to the bottom of the hopper and force the same into the press chamber. Upon the reverse movement of the press plunger the pusher 73 is withdrawn from the press chamber and the division board 50 is permitted to fall back producing the opening 55 through which the material collected while the division board was in closed position falls to the opening 62 and upon the top 61 of the plunger head.

Fig. 6 illustrates a modification of the plunger mechanism in which a separate door 80 is hinged to the rod 51 and operable by a cord 56 to cut off material while the follower is being inserted through opening 57. In this form of device the division board 50 is permanently connected by a link 81 with an arm 82 pivoted to the stand 70. The pusher 73 and link 74 being in other respects similar to those illustrated in Figs. 5 and 6 so that the portion of the pusher to force the straw into the press chamber 58 will synchronously operate the division board 50 and the partition 80 which normally will rest upon said division board.

The full objects and advantages of my invention will be apparent. The straw with either the chaff, or having the chaff previously separated therefrom, is carried directly to the hopper and feeder mechanism of the baling press. The synchronous operation of the press plunger 60, the pusher head 73 and the division board 50 insures its automatic and uniform delivery of this straw in suitable quantities to the press chamber in front of the press plunger. This results in thoroughly efficient and rapid baling of the straw exactly in time with its separation from the grain in the threshing machine. The result is the entire body of straw is formed into bales which may be used for bedding or feed on the farm or may be used for commercial purposes.

I claim:

1. In combination with means for feeding straw, a baling press embodying a press chamber, means carried upon the press chamber for receiving the straw from the feeding means, and means for automatically intermittently releasing bodies of straw so received to permit the same to enter the press chamber.

2. In combination with means for feeding straw, a baling press embodying a press chamber, means carried upon the press chamber for receiving the straw from the feeding means, means for automatically intermittently releasing bodies of straw so received to permit the same to enter the press chamber, and means for thereafter forcing such released body into the press chamber.

3. In combination with means for feeding straw, a baling press embodying a press chamber, a hopper having communication with said press chamber for receiving the straw from said feeding means, a swinging division board in the hopper, and means for automatically swinging said board to effect collection of determined quantities of straw and subsequent discharge thereof to the press chamber.

4. In combination with means for feeding straw, a baling press embodying a press chamber, a hopper having communication with said press chamber for receiving the straw from said feeding means, a swinging division board in the hopper, means for swinging said board to effect collection of determined quantities of straw and subsequent discharge thereof to the press chamber, and means operative synchronously with the swinging board for forcing said quantities of straw into the press chamber.

5. In combination with means for feeding straw, a baling press embodying a press chamber and a press plunger operative therein, a hopper having communication with said press chamber for receiving the straw from the said feeding means, a swinging division board in the hopper, means for swinging the board to close off a part of the hopper to effect collection of determined quantities of straw and subsequent discharge thereof to the press chamber, a pusher adapted to enter the press chamber and force said quantities of straw thereinto, and means operative synchronously with the movement of the plunger head for swinging the division board and operating the pusher.

In testimony whereof I hereunto affix my signature.

JOHN T. SMITH.